US010559918B2

(12) United States Patent
Gunreben et al.

(10) Patent No.: US 10,559,918 B2
(45) Date of Patent: Feb. 11, 2020

(54) ELECTRICAL CONNECTOR ASSEMBLY

(71) Applicant: Aptiv Technologies Limited, St. Michael (BB)

(72) Inventors: Michael Gunreben, Schwanstetten (DE); Frank Odoerfer, Rothenbach an der Pegnitz (DE)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/953,601

(22) Filed: Apr. 16, 2018

(65) Prior Publication Data
US 2018/0316128 A1 Nov. 1, 2018

(30) Foreign Application Priority Data

Apr. 27, 2017 (EP) ..................................... 17168505

(51) Int. Cl.
| | |
|---|---|
| *H01R 13/627* | (2006.01) |
| *H01R 13/631* | (2006.01) |
| *H01R 13/502* | (2006.01) |
| *B60R 16/02* | (2006.01) |
| *B60R 21/217* | (2011.01) |

(52) U.S. Cl.
CPC ......... *H01R 13/6272* (2013.01); *B60R 16/02* (2013.01); *H01R 13/5025* (2013.01); *H01R 13/631* (2013.01); *B60R 21/217* (2013.01); *B60Y 2410/115* (2013.01); *H01R 2201/26* (2013.01)

(58) Field of Classification Search
CPC ............ H01R 13/6272; H01R 13/5025; H01R 13/627; H01R 13/631; H01R 13/639; H01R 13/506; H01R 13/582; H01R 13/6275; H01R 13/641; H01R 13/6395; H01R 13/658; H01R 13/6215; H01R 2201/26; B60R 16/02; B60R 21/217; B60R 21/16; B60Y 2410/115
USPC .................................. 439/347, 352, 362, 370
See application file for complete search history.

(56) References Cited

U.S. PATENT DOCUMENTS

| | | | |
|---|---|---|---|
| 4,449,778 A | * 5/1984 | Lane ...................... | H01R 9/032 |
| | | | 439/607.47 |
| 4,684,192 A | 8/1987 | Long et al. | |
| 5,435,742 A | * 7/1995 | Cecil, Jr. .............. | H01R 13/639 |
| | | | 439/347 |

(Continued)

FOREIGN PATENT DOCUMENTS

CN 104425988 A 3/2015

*Primary Examiner* — Edwin A. Leon
*Assistant Examiner* — Milagros Jeancharles
(74) *Attorney, Agent, or Firm* — Robert J. Myers

(57) ABSTRACT

An electrical connector assembly includes a plug body comprising a first housing part and a second housing part with a plug-in portion. The housing parts are movable relative to each other along a housing axis. An elastic element holds the housing parts against each other. The second housing part has a projection with a first sliding surface diagonally to the housing axis. The electrical connector assembly further includes a mating connector having a collar with a second sliding surface cooperating with the first sliding surface. The second housing part is displaced away from the first housing part along the housing axis against a restoring force of the elastic element. The second sliding surface ends at a recess in the collar, so that the elastic element pulls the projection into the recess and locks the plug body with the mating connector.

15 Claims, 5 Drawing Sheets

(56) References Cited

U.S. PATENT DOCUMENTS

| | | | | |
|---|---|---|---|---|
| 5,538,434 | A * | 7/1996 | DelGuidice | H01R 4/2433 |
| | | | | 439/188 |
| 6,135,802 | A * | 10/2000 | Nakamura | H01R 13/453 |
| | | | | 439/138 |
| 6,524,135 | B1 * | 2/2003 | Feldman | H01R 9/035 |
| | | | | 439/607.46 |
| 6,641,424 | B1 * | 11/2003 | Hanak | H01R 13/639 |
| | | | | 439/352 |
| 7,588,459 | B2 * | 9/2009 | Sugii | H01R 13/743 |
| | | | | 343/715 |
| 8,968,021 | B1 * | 3/2015 | Kennedy | H01R 13/6273 |
| | | | | 439/352 |
| 9,017,090 | B2 * | 4/2015 | Matsumoto | H01R 13/6275 |
| | | | | 439/350 |
| 9,172,187 | B2 * | 10/2015 | Miyakawa | H01R 13/629 |
| 9,868,021 | B2 | 1/2018 | Lugton et al. | |
| 2001/0001750 | A1 * | 5/2001 | Kawase | H01R 13/6272 |
| | | | | 439/489 |
| 2006/0079118 | A1 * | 4/2006 | Holweg | H01R 13/6273 |
| | | | | 439/489 |
| 2009/0023327 | A1 * | 1/2009 | Takahashi | H01R 13/506 |
| | | | | 439/357 |
| 2009/0221173 | A1 | 9/2009 | Duval | |
| 2013/0072054 | A1 * | 3/2013 | Hotea | H01R 13/506 |
| | | | | 439/460 |
| 2015/0056841 | A1 * | 2/2015 | Siwek | H01R 13/6273 |
| | | | | 439/352 |
| 2015/0162706 | A1 * | 6/2015 | Kennedy | H01R 13/6273 |
| | | | | 439/357 |
| 2018/0316138 | A1 * | 11/2018 | Holweg | H01R 13/193 |

* cited by examiner

ELECTRICAL CONNECTOR ASSEMBLY

CROSS-REFERENCE TO RELATED APPLICATION

This application claims the benefit under 35 U.S.C. § 119(a) of Patent Application No. 17168505.0 filed in the European Patent Office on Apr. 27, 2017, the entire disclosure of which is hereby incorporated by reference.

TECHNICAL FIELD OF THE INVENTION

The present invention relates to an electrical connector assembly particularly useful with airbag restraint systems.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
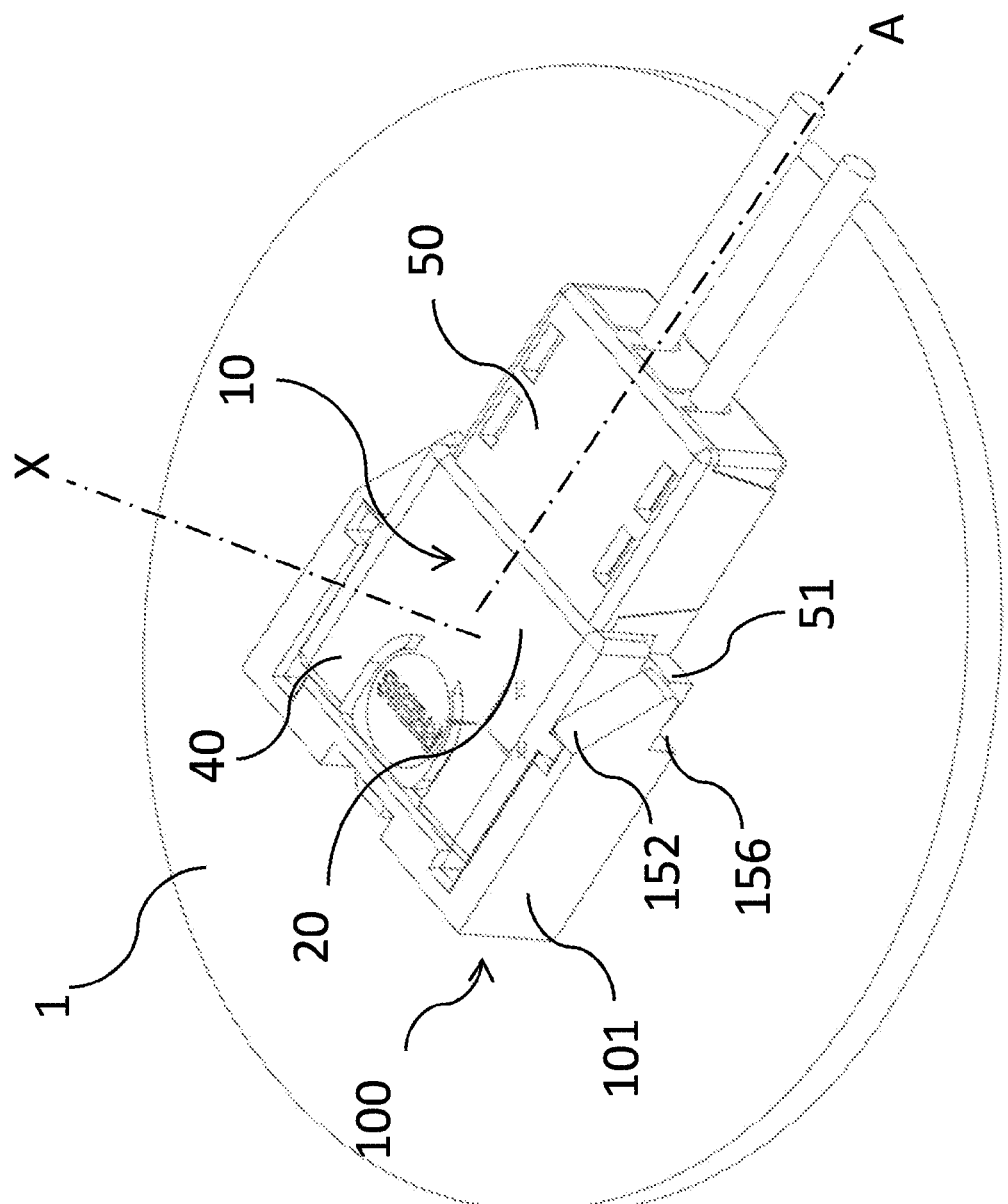
FIG. 1 shows the connector assembly in perspective view in accordance with one embodiment.

An electrical connector assembly for an airbag ignition mechanism shown in FIGS. 1-8 is described herein. The electrical connector assembly includes a plug 10 with a plug body 20 comprising a first housing part 40 and a second housing part 50 with a plug-in portion 30. The housing parts are movable relative to each other along a housing axis, wherein an elastic element 90 holds the housing parts against each other. The second housing part 50, on its surface, comprises a projection 51 with a first sliding surface 52 diagonally to the housing axis. A mating connector 100, having a plug-receiving portion 110 which is configured to receive and electrically and mechanically connect the plug-in portion 30 of the plug 10, comprises a collar 101 which partially surrounds the plug-receiving portion 110. The collar 101 comprises a second sliding surface 152 which is arranged complementary to the first sliding surface 52. When the plugs are aligned on a plug-in axis while the plugs are connected, the sliding surfaces cooperate. A plug force is exerted on the plug 10 in the insertion direction and thereby the first sliding surface 52 slides on the second sliding surface 152, wherein the second housing part 50 is displaced away from the first housing part 40 along the housing axis against a restoring force of the elastic element 90. The second sliding surface 152 ends at a recess 156 in the collar 101. In fully assembled state, the projection 51 is located in an end plane with the recess 156, so that the elastic element 90 pulls the projection 51 into the recess 156 and locks the plug body 20 with the plug-receiving portion 110.

This electrical connector assembly ensures that the plug 10 is only then locked to the mating connector 100 when it is fully inserted. If the plug 10 is not fully inserted, the plug 10 is pulled out of the mating connector 100 by the elastic element 90 when the insertion force is removed. The worker immediately sees that the plug 10 is not inserted correctly and may repeat the process. However, if the plug 10 is correctly inserted, the projections snap into the recesses and securely lock the plug 10. The plug 10 is locked at several points to hold the plug 10 particularly firm against the mating connector 100. This locking concept allows to design very flat plug 10-in connectors.

According to one embodiment, the plug 10 comprises contact springs 16 which are held in the second housing part 50 and the mating connector 100 comprises contact pins 111 which have a rectangular cross-section. The selection of the contact parts is particularly advantageous in this embodiment as the contact elements are moved towards each other at a right angle with regard to the plug-in axis to contact it. The contact pins 111 may be formed such that a blade geometry is created along the housing axis. As a result, manufacturing tolerances of the housings may be compensated. The contact spring may contact the contact pins 111 at several contact points along the housing axis.

According to this embodiment, the contact springs 16 establish an electrical connection with the contact pins 111 only after the plug 10 and the mating connector 100 are in their final mechanical position along the plug-in axis and the projection 51 is received in the recess 156. This structure avoids accidental contacting and again releasing the contact elements during mating of the connector assembly. As a result, the contact surfaces are less strained and lifetime and reliability are increased.

According to a further embodiment, the plug body 20, in its final mechanical position, does not protrude beyond the collar 101 against the direction of insertion. The plug body 20 is surrounded by the collar 101 such that it does not protrude from the mating connector 100. As a result, the connector assembly along the plug-in axis can be formed very flat, which allows to use the connector assembly even in very confined installation positions.

According to this embodiment, the plug body 20 has a flat, elongate shape whose dimension along the housing axis, which is rectangular to the plug-in axis, is larger than in the direction of the plug-in axis. Due to the relatively flat structure relative to the plug-in axis, it is possible to use the connector assembly in confined spaces.

According to a further embodiment, the first housing part 40 comprises at least one rib 32 which is aligned along the plug-in axis and wherein the mating connector 100 comprises at least one groove 104 at the side facing the plug-receiving portion 110, wherein the rib 32 slides into the groove 104 while the plugs are connected. The interaction of the rib 32 and the groove 104 allows for a precise guidance of the plug 10 in the mating connector 100 and, on the other hand, the rib 32 holds the first housing part 40 in position when the second housing part 50 is displaced. The rib 32 prevents displacement of the first housing part 40 when the elastic element 90 effects a force along the housing axis. For the rib 32-groove 104 combination to hold the first housing part 40, upon insertion in the insertion direction, the rib 32 first has to engage the groove 104 before the second housing is moved away from the first housing.

According to this embodiment, a plurality of rib 32 and groove 104 pairs is provided which are unevenly distributed. When using multiple rib 32-groove 104 pairs, on the one hand, the retention capability increases, on the other hand, this results in coding options for the connector assembly. As a result, connecting errors are avoided during assembly, as given plugs can only be connected to given mating connectors. This is particularly useful when several, similar-looking mating connectors are arranged side by side.

In accordance with a further embodiment, the plug body 20 and the collar 101 have a rectangular cross-section about the plug-in axis. A rectangular cross-section facilitates the insertion of the plug 10 since the insertion position is predetermined by the geometry.

According to this embodiment, the elastic element 90 is compressed between the first housing part 40 and the second housing part 50, while the plug 10 is moved into the mating connector 100. This structure allows, in this connector assembly, to use a variety of different elastic elements, resulting in different solutions for different applications. Furthermore, the structure is simple and therefore robust.

According to a further embodiment, the elastic element 90 is a coil spring. The use of a coil spring as an elastic element 90 is recommended for use in vehicles, since there are large variations of temperature and vibrations to be expected. A coil spring, which is preferably formed of metal, meets these requirements. For use in other environments, plastic coil springs may also be used.

According to a further embodiment, the mating connector 100 is firmly connected to a housing wall 1 of an airbag ignition mechanism. To keep production costs low, the mating connector 100 may be integrally formed with a housing wall 1 of the airbag housing.

According to a further embodiment, the second housing part 50 comprises a web 55 which has at its front end a latch 60 held in a locking slot 160 of the collar 101 when the plug 10 is completely inserted into the mating connector 100. This structure provides an additional locking position, so that the plug 10 is held even more securely in the mating connector 100. In this case, the latch 60 is located away from the projection 51 so that locking points are distributed locally on the plug 10.

According to a further embodiment, the web 55 extends through the first housing part 40. This structure protects the long web 55 from damage. In addition, it can be used to guide the second housing part 50. As such, the stability of the plug 10 is increased.

According to this embodiment, the first housing part 40 comprises a flexible tongue 62 which is mounted in front of the web 55 in insertion direction and allows unlocking of the latch 60. The flexible tongue 62 deforms slightly when a force is applied in the insertion direction. The underlying web 55 is deflected in the direction of insertion, thereby releasing the latch 60. Thereafter, the second housing part 50 can be moved away from the first housing part 40 and the plug 10 can be fully unlocked.

FIG. 1 shows the electrical connector assembly, wherein the mating connector 100 is firmly connected with a housing wall 1 of an airbag ignition mechanism. A plug 10 with a plug body 20 comprises a first housing part 40 and a second housing part 50 with a plug-in portion 30 (FIG. 3), wherein the first and second housing parts 40, 50 are movable relative to one another along a housing axis A. An elastic element 90 (FIG. 3) holds the first and second housing parts 40, 50 together. The second housing part 50 has on its surface a projection 51 with a first sliding surface 52 (FIG. 3) diagonally to the housing axis A. The plug body 20 has a flat, elongate shape whose dimension along the housing axis A, which is rectangular to the plug-in axis X, is larger than in the direction of the plug-in axis. The plug body 20 and the mating connector 100 have a rectangular cross-section about the plug-in axis X.

Figure 2:
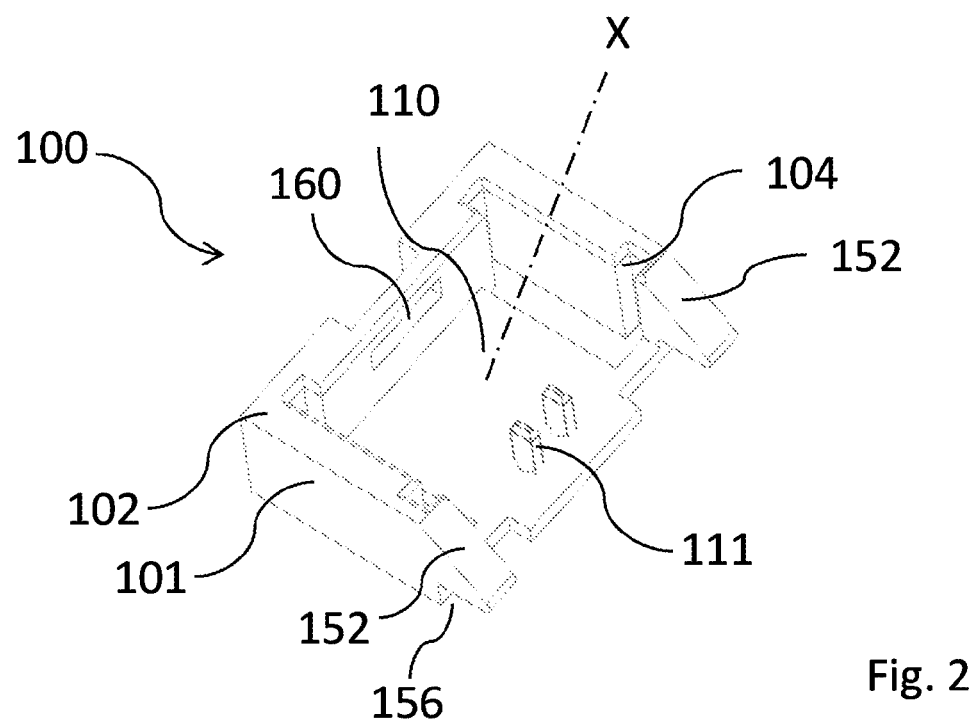
FIG. 2 shows the mating connector in perspective view in accordance with one embodiment.

FIG. 2 shows a mating connector 100 with a plug-receiving portion 110 which is configured to receive and electrically and mechanically connect the plug-in portion 30 of the plug 10. The mating connector 100 comprises a collar 101 partially surrounding the plug-receiving portion 110. The collar 101 has a rectangular cross-section about the plug-in axis X. The collar 101 has a second sliding surface 152 which is arranged complementary to the first sliding surface 52. The second sliding surface 152 extends from a collar edge 102 which extends in a plane perpendicular to the plug-in axis X, at an angle to the housing axis A, in the direction of insertion Y. Contact pins 111 having a rectangular cross-section protrude from the plug-receiving portion 110 along the plug-in axis X. The contact pins 111 are aligned with the housing axis A. The mating connector 100, on the side facing the plug-receiving portion 110, comprises a groove 104 which is configured to receive a rib 32 (FIG. 4) of the plug 10.

Figure 3:
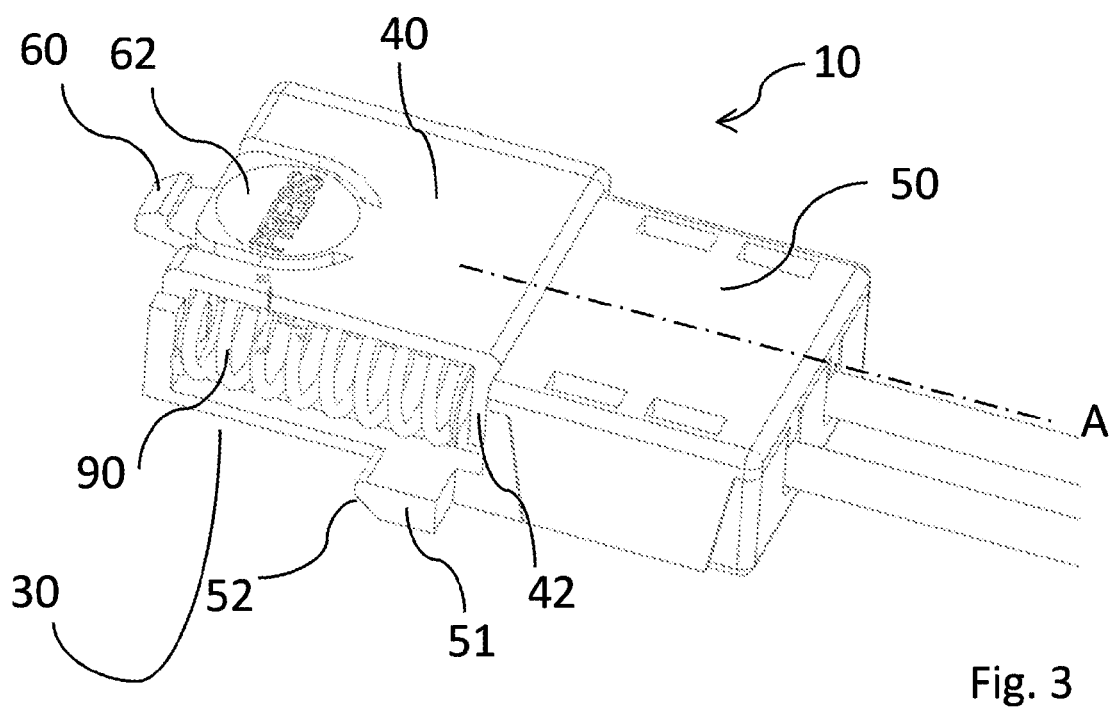
FIG. 3 shows the plug in perspective sectional view in accordance with one embodiment.

FIG. 3 shows a perspective view of a plug 10 with a plug body 20, formed from a first housing part 40 and a second housing part 50. The plug body 20 has a flat, rectangular shape along a housing A axis. The second housing part 50 comprises a latch 60. The first housing part 40 comprises a flexible tongue 62 which is mounted in front of the latch 60 in insertion direction Y and allows unlocking of the latch 60.

Figure 4:
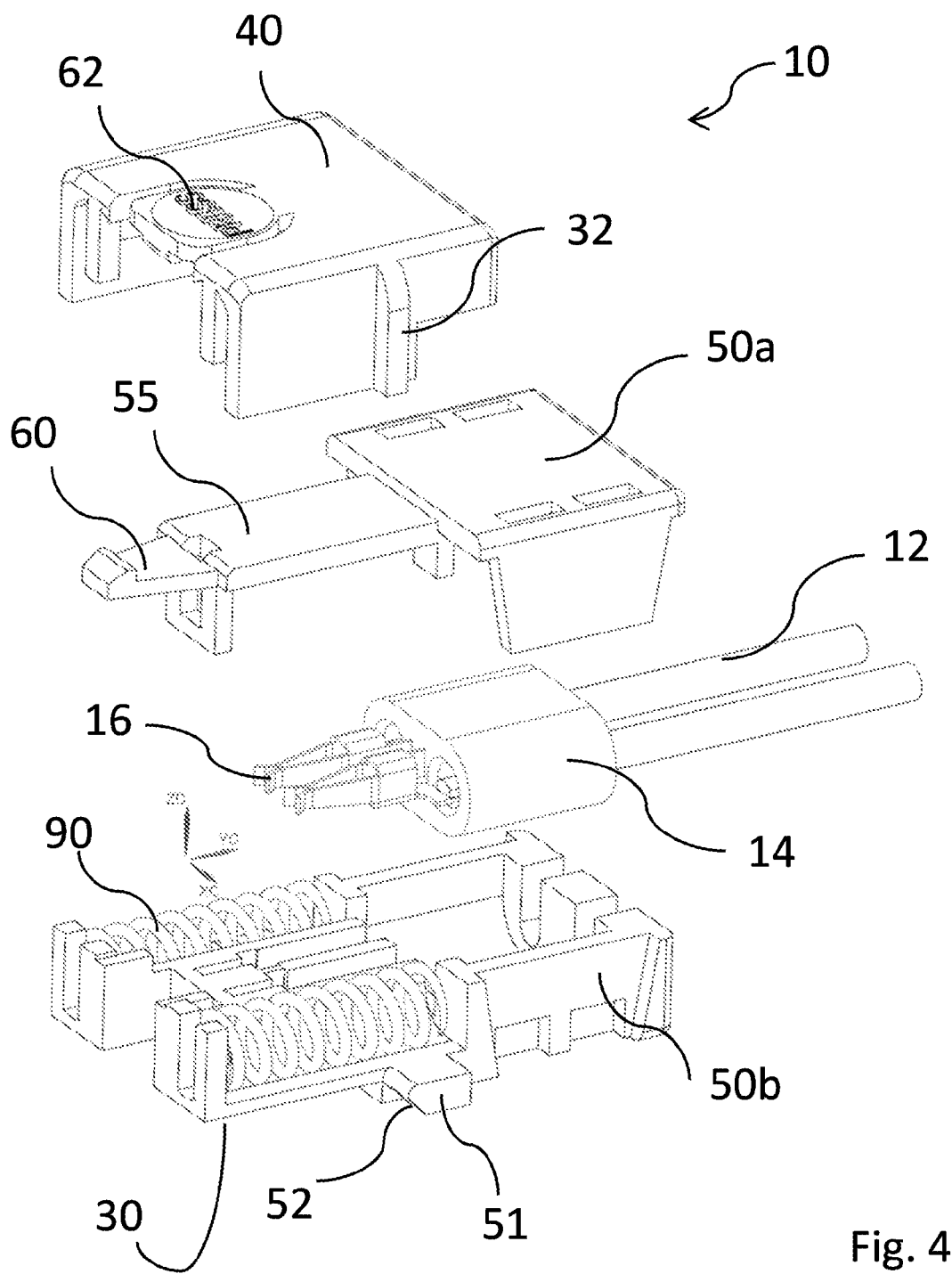
FIG. 4 shows the plug in an exploded view in accordance with one embodiment.

FIG. 4 shows the plug 10 in an exploded view. Contact elements in the form of contact springs 16 are attached to an electrical line 18. A ferrite element 14 surrounds the electrical line 18 and partially the contact elements. The ferrite element 14 and the contact elements are held in the second housing part 50. In this embodiment, the second housing part 50 consists of two parts. A housing base 50b receives the elastic element 90 as well as the contact elements and the ferrite element 14. A housing cover 50a is fixed to the housing base 50b to form the second housing part 50. In this embodiment, a web 55 extends from the housing cover 50a along the housing axis A. The web 55 extends through the first housing part 40. From the end portion of the web 55, a latch 60 extends along the housing axis. The first housing part 40 has a rib 32 which is aligned along the plug-in axis X. The latch 60 is configured to be held in a locking slot 160 of the collar 101 when the plug 10 is fully inserted into the mating connector 100. In this embodiment, the elastic element 90 is formed by two coil springs. The flexible tongue 62, which is mounted in front of the latch 60 in insertion direction Y and allows unlocking of the latch 60 is formed by cuts in a housing wall 1 of the first housing part 40.

Figure 5:
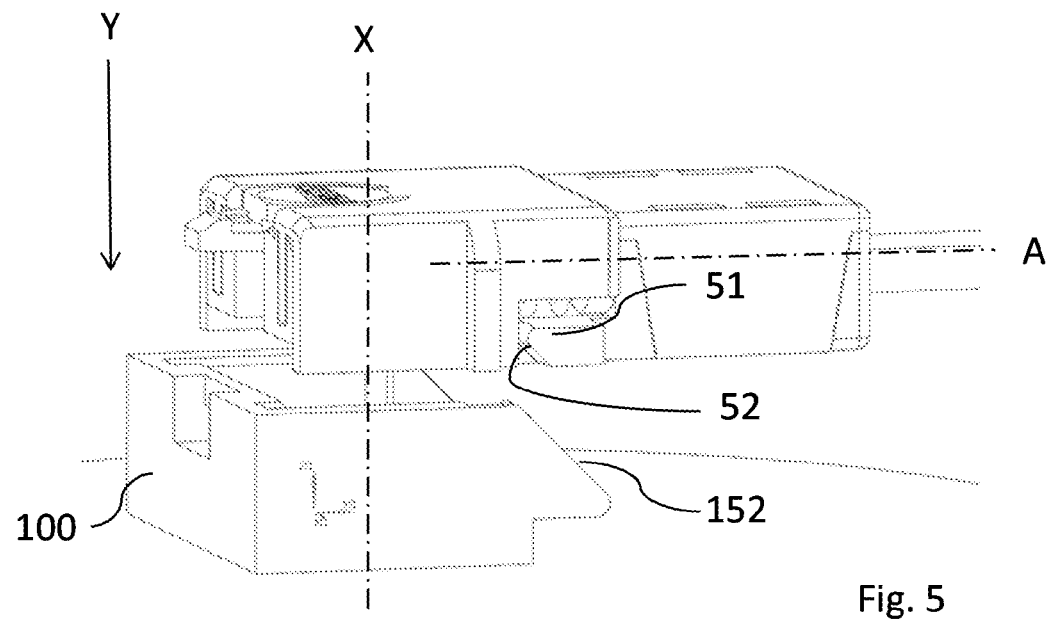
FIG. 5 shows the connector assembly in perspective view, with plug and mating connector separated in accordance with one embodiment.

FIG. 5 shows the electrical connector assembly in a position wherein the plug 10 and the mating connector 100 are aligned with the plug-in axis X, but the insertion process has not yet begun.

Figure 6:
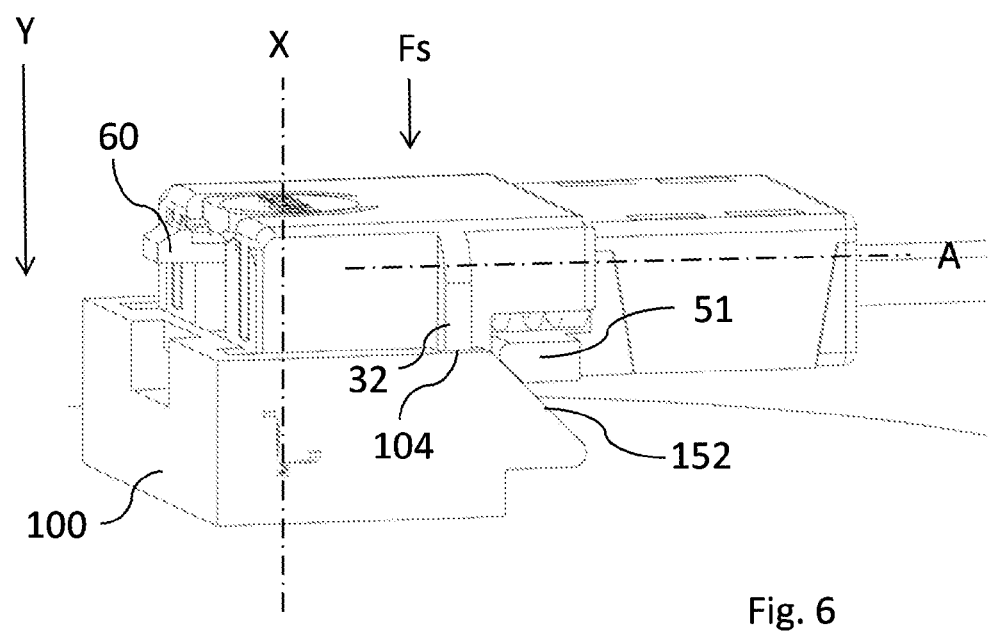
FIG. 6 shows the connector assembly in perspective view in a position at the beginning of the insertion process in accordance with one embodiment.

FIG. 6 shows the plug 10 and the mating connector 100, which is aligned with the plug-in axis X, and the insertion process begins. A portion of the rib 32 on the plug 10 is received within the groove 104 of the mating connector 100 and limits the freedom of movement to the plug-in axis X. The first sliding surface 52 of the plug 10 and the second sliding surface 152 of the mating connector 100 are abutting each other.

Figure 7:
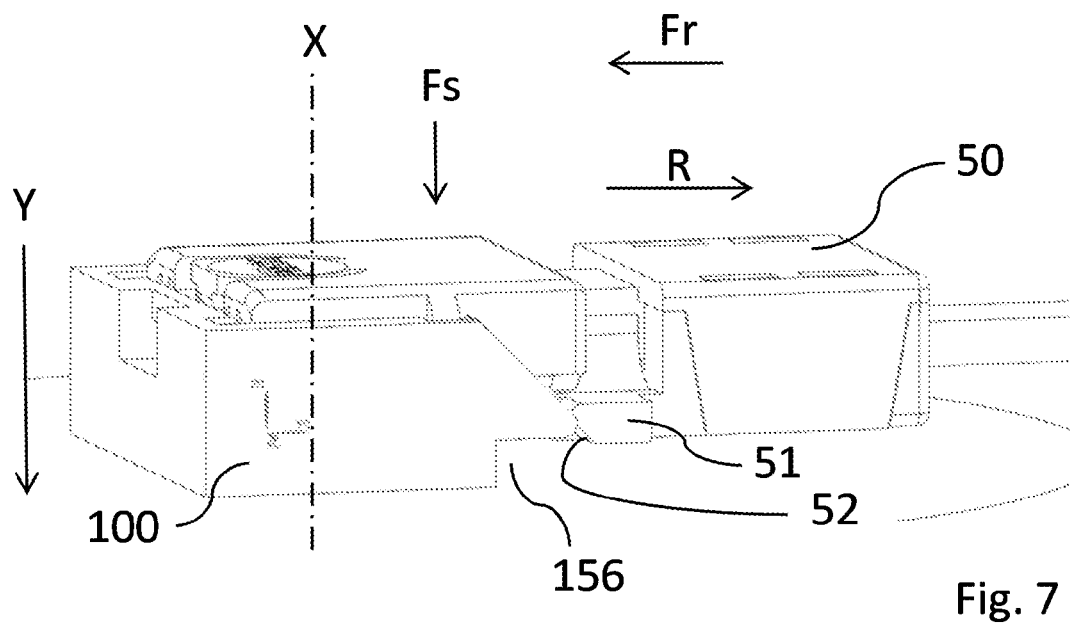
FIG. 7 shows the connector assembly in perspective view in a position before reaching the final position in accordance with one embodiment.

FIG. 7 shows the plugs while being connected together, with the position of the plug 10 corresponding to a position just before the final position. The first and second sliding surfaces 52, 152 cooperate, wherein an insertion force Fs is exerted in the insertion direction Y on the plug 10 and thereby the first sliding surface 52 slides on the second sliding surface 152. The second housing part 50 is moved away in a direction R away from the first housing part 40 against a restoring force Fr of the elastic element 90 along the housing axis A. The second sliding surface 152 ends at a recess 156 in the collar 101. The elastic element 90 is compressed between the first housing part 40 and the second housing part 50, while the plug 10 is moved into the mating connector 100.

Figure 8:
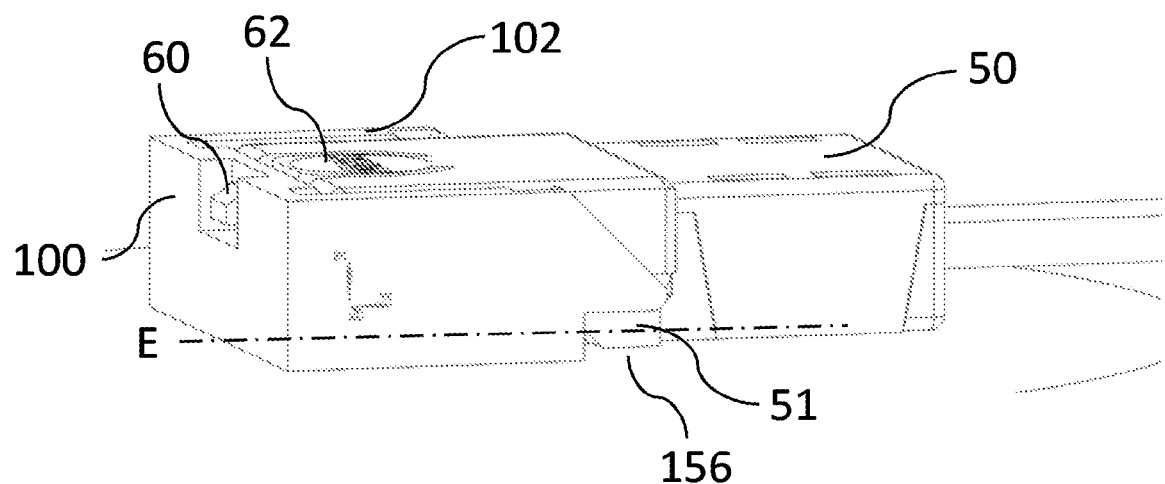
FIG. 8 shows the connector assembly in perspective view in the final position in accordance with one embodiment.

FIG. 8 shows the connector assembly in a completely assembled state. The projection 51 is in an end plane E with the recess 156. The elastic element 90 has pulled the projection 51 into the recess 156 and locked the plug body 20 with the mating connector 100. The contact springs 16 only make an electrical connection with the contact pins 111 after the plug 10 and the plug-receiving portion 110 are in their final mechanical position along the plug-in axis X and the projection 51 is received in the recess 156. The plug body 20 does not protrude beyond the collar 101 opposite to the insertion direction Y in its final position. The latch 60 is received and held in the locking slot 160 of the mating connector 100.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'One or more' includes a function being performed by one element, a function being performed by more than one element, e.g., in a distributed fashion, several functions being performed by one element, several functions being performed by several elements, or any combination of the above.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

While terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:
1. An electrical connector assembly, comprising;
a plug including a plug body having a first housing part and a second housing part with a plug-in portion, wherein the first and second housing parts are movable relative to each other along a housing axis, wherein an elastic element is compressed between the first and second housing parts, thereby holding the first and second housing parts against each other, wherein the second housing part on its surface comprises a projection with a first sliding surface diagonally to the housing axis; and
a mating connector, having a plug-receiving portion configured to receive and electrically and mechanically connect the plug-in portion of the plug, comprises a collar which partially surrounds the plug-receiving portion, wherein the collar comprises a second sliding surface which is arranged complementary to the first sliding surface, when the plug is aligned with a plug-in axis while the plug is connected the first and second sliding surfaces cooperate, wherein a plug force is exerted on the plug in an insertion direction and thereby the first sliding surface slides on the second sliding surface, wherein the second housing part is displaced away from the first housing part along the housing axis against a restoring force of the elastic element, the second sliding surface ends at a recess in the collar, in fully assembled state the projection is located in an end plane with the recess, so that the elastic element pulls the projection into the recess and locks the plug body with the mating connector, wherein the first housing part comprises at least one rib which is aligned along the plug-in axis and wherein the mating connector comprises a groove at the side facing the plug-receiving portion, wherein the rib slides into the groove while the plug is connected.

2. The electrical connector assembly according to claim 1, wherein the plug comprises contact springs which are held in the second housing part and the mating connector comprises contact pins which have a rectangular cross-section.

3. The electrical connector assembly according to claim 2, wherein the contact springs establish an electrical connection with the contact pins only after the plug and the mating connector are in their final mechanical position along the plug-in axis and the projection is received in the recess.

4. The electrical connector assembly according to claim 1, wherein the plug body in its final mechanical position does not protrude beyond the collar against the insertion direction.

5. The electrical connector assembly according to claim 1, wherein the plug body has a flat, elongate shape whose dimension along the housing axis, which is rectangular to the plug-in axis, is larger than in a direction of the plug-in axis.

6. The electrical connector assembly according to claim 1, wherein the plug body and the collar have a rectangular cross-section about the plug-in axis.

7. The electrical connector assembly according to claim 1, wherein the elastic element is compressed between the first housing part and the second housing part while the plug is moved into the mating connector.

8. The electrical connector assembly according to claim 1, wherein the elastic element is a coil spring.

9. The electrical connector assembly according to claim 1, wherein the mating connector is firmly connected to a housing wall of an airbag ignition mechanism.

10. The electrical connector assembly according to claim 1, wherein the second housing part comprises a web which has at its front end a latch held in a locking slot of the collar when the plug is completely inserted into the mating connector.

11. The electrical connector assembly according to claim 10, wherein the web extends through the first housing part.

12. The electrical connector assembly according to claim 1, wherein a plurality of rib and groove pairs are provided which are unevenly distributed.

13. An electrical connector assembly comprising;
a plug including a plug body having a first housing part and a second housing part with a plug-in portion, wherein the first and second housing parts are movable relative to each other along a housing axis, wherein an elastic element holds the first and second housing parts against each other, wherein the second housing part on its surface comprises a projection with a first sliding surface diagonally to the housing axis; and
a mating connector having a plug-receiving portion configured to receive and electrically and mechanically connect the plug-in portion of the plug and comprising a collar which partially surrounds the plug-receiving portion, wherein the collar comprises a second sliding surface which is arranged complementary to the first sliding surface, when the plug is aligned with a plug-in axis while the plug is connected the first and second sliding surfaces cooperate, wherein a plug force is exerted on the plug in an insertion direction and thereby the first sliding surface slides on the second sliding surface, wherein the second housing part is displaced away from the first housing part along the housing axis against a restoring force of the elastic element, the second sliding surface ends at a recess in the collar, in fully assembled state the projection is located in an end plane with the recess, so that the elastic element pulls the projection into the recess and locks the plug body with the mating connector, wherein the first housing part comprises at least one rib which is aligned along the plug-in axis and wherein the mating connector comprises a groove at the side facing the plug-receiving portion, wherein the rib slides into the groove while the plug is connected, and wherein a plurality of rib and groove pairs are provided which are unevenly distributed.

14. An electrical connector assembly comprising;
a plug including a plug body having a first housing part and a second housing part with a plug-in portion, wherein the first and second housing parts are movable relative to each other along a housing axis, wherein an elastic element holds the first and second housing parts against each other, wherein the second housing part on its surface comprises a projection with a first sliding surface diagonally to the housing axis; and
a mating connector having a plug-receiving portion configured to receive and electrically and mechanically connect the plug-in portion of the plug and comprising a collar which partially surrounds the plug-receiving portion, wherein the collar comprises a second sliding surface which is arranged complementary to the first sliding surface, when the plug is aligned with a plug-in axis while the plug is connected the first and second sliding surfaces cooperate, wherein a plug force is exerted on the plug in an insertion direction and thereby the first sliding surface slides on the second sliding surface, wherein the second housing part is displaced away from the first housing part along the housing axis against a restoring force of the elastic element, the second sliding surface ends at a recess in the collar, in fully assembled state the projection is located in an end plane with the recess, so that the elastic element pulls the projection into the recess and locks the plug body with the mating connector, wherein the second housing part comprises a web which has at its front end a latch held in a locking slot of the collar when the plug is completely inserted into the mating connector, wherein the web extends through the first housing part, and wherein the first housing part comprises a flexible tongue which is mounted in front of the web in the insertion direction and allows unlocking of the latch.

15. An electrical connector assembly, comprising:
a plug including a plug body having a first housing part and a second housing part with a plug-in portion, wherein the first and second housing parts are movable relative to each other along a housing axis, wherein an elastic element is compressed between the first and second housing parts, thereby holding the first and second housing parts against each other, wherein the second housing part on its surface comprises a projection with a first sliding surface diagonally to the housing axis; and
a mating connector, having a plug-receiving portion configured to receive and electrically and mechanically connect the plug-in portion of the plug, comprises a collar which partially surrounds the plug-receiving portion, wherein the collar comprises a second sliding surface which is arranged complementary to the first sliding surface, when the plug is aligned with a plug-in axis while the plug is connected the first and second sliding surfaces cooperate, wherein a plug force is exerted on the plug in an insertion direction and thereby the first sliding surface slides on the second sliding surface, wherein the second housing part is displaced away from the first housing part along the housing axis against a restoring force of the elastic element, the second sliding surface ends at a recess in the collar, in fully assembled state the projection is located in an end plane with the recess, so that the elastic element pulls the projection into the recess and locks the plug body with the mating connector, wherein the second housing part comprises a web which has at its front end a latch held in a locking slot of the collar when the plug is completely inserted into the mating connector, wherein the web extends through the first housing part, and, wherein the first housing part comprises a flexible tongue which is mounted in front of the web in the insertion direction and allows unlocking of the latch.

* * * * *